(No Model.)
J. M. CRITCHLOW.
PROCESS OF DECOMPOSING AND CARBURETING NATURAL GAS.
No. 347,693. Patented Aug. 17, 1886.
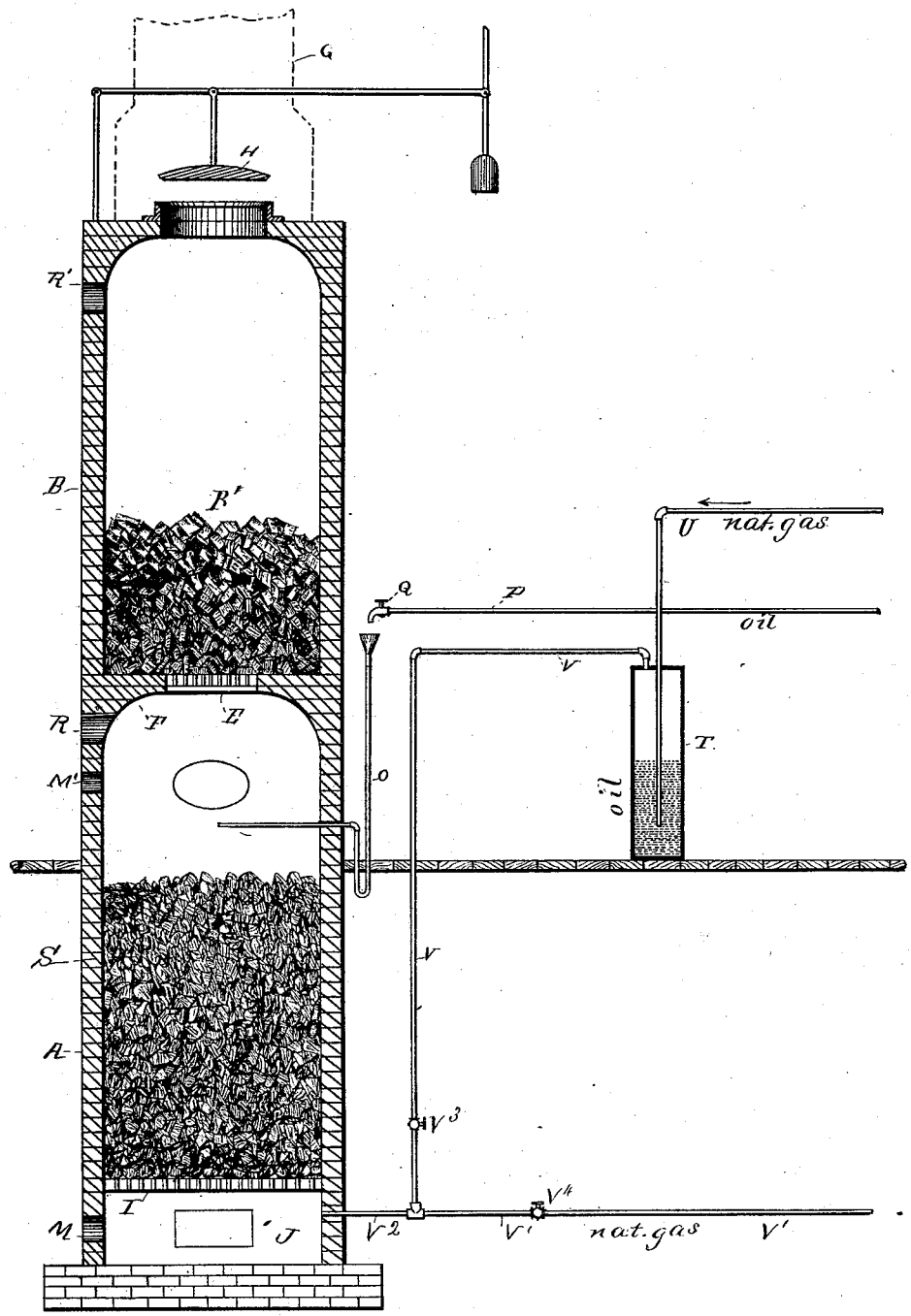
WITNESSES
INVENTOR
John M Critchlow
By A. C. Johnston
Attorney

UNITED STATES PATENT OFFICE.

JOHN M. CRITCHLOW, OF BEAVER FALLS, PENNSYLVANIA.

PROCESS OF DECOMPOSING AND CARBURETING NATURAL GAS.

SPECIFICATION forming part of Letters Patent No. 347,693, dated August 17, 1886.

Application filed December 17, 1885. Serial No. 185,999. (No model.)

*To all whom it may concern:*

Be it known that I, JOHN M. CRITCHLOW, of Beaver Falls, in the county of Beaver and State of Pennsylvania, have invented a new and useful Improvement in Process of Decomposing and Carbureting Natural Gas; and I do hereby declare the following to be a full, clear, and exact description thereof.

My invention relates to an improvement in process of decomposing and carbureting natural gas, and has for its object the treatment of fixed natural gases by an improved process, whereby they are enriched by an addition of combined carbon atoms, and a resultant fixed gas is obtained which is richer and a better illuminant than natural gas, the small proportion of whose carbon atoms renders it in its pure state of little value for anything but heating purposes.

Natural gas is constituted of a mixture of several primary gases, among which are methane ($CH_4$) and kindred gases, generally present as about seventy or eighty per cent. of the whole mass, and some carbon dioxide gas, ($CO_2$,) which latter is present in sufficient degree to exercise a deleterious effect on the illuminating-power of the gas.

The general purpose of my improved process is to decompose the gases by the conversion of the carbon dioxide to carbon monoxide, and by the conversion of the methane to ethane, ($C_2H_6$,) propane, ($C_3H_8$,) or some other gas of the same series richer in carbon than methane.

To this end my invention consists, first, in passing natural gas through a chamber containing incandescent carbonaceous material—such as coal, coke, &c.—the effect of which on the gas is to convert its carbonic acid, if any, to carbonic oxide, and to raise it to an intense heat, bringing it to the state necessary for it to combine with the subsequently-added liquid hydrocarbon; second, in introducing hydrocarbon liquid upon or in the incandescent carbonaceous mass, which disassociates its elements and causes it to unite with the natural gas as a fixed or partially-fixed gas, combining with its methane atoms to form ethane or propane, &c.; and finally, if necessary, passing these gases through a second heating-chamber for the purpose of more thoroughly fixing the compound. The result is a fixed illuminating-gas of good luminous properties, and not subject to condensation or loss of carbon. The above process may be varied, and substantially the same result obtained by mixing the vapors of the hydrocarbon liquid with the gas before the gas is passed through the incandescent carbonaceous mass, so that both shall be subjected to the converting influence of the latter at the same time.

The apparatus which I prefer to use in carrying my improved process into effect is shown in the accompanying drawing, which is a vertical sectional view thereof.

In the drawing, A is a combustion chamber or vessel, having at its base grate-bars I and an ash-pit, J, thereunder, to which a blast of air is admitted through a hole, M, to support the combustion in the chamber A. A second chamber, B, surmounts the chamber A, and communicates therewith through holes E in the arch F of the chamber A.

G is a stack for conveying the waste products of combustion from the chamber A. It is controlled by a damper, H.

R is a port, through which gas is led from the chamber A. R' is a similar port in the wall of the chamber B, and M' is the adit of an air-blast into the upper part of the chamber A.

A pipe, V' $V^2$, controlled by a valve, $V^4$, conveys natural gas into the pit J beneath the bars I.

O is a seal-pipe, which discharges into the upper part of the chamber A, and is fed with naphtha or similar liquid hydrocarbon from a pipe, P, which discharges through a spigot, Q, into the open end of the pipe O.

The parts U, T, and V are auxiliary devices, which I will describe hereinafter.

The operation is as follows: The chamber A is partly filled with coal, coke, or other solid carbonaceous fuel, S, which is ignited at the base, and is forced by an air-blast of the pipe M until the mass is thoroughly fixed and reduced to an incandescent state. The air-blast is then shut off at M and the damper H closed to seal the chamber and excluding air to check combustion. The cock $V^4$ is then opened to admit gas to the pit J, and the spigot Q is also turned so to cause naphtha from the pipe P to enter the seal-pipe O and to drip upon the surface of the incandescent fuel S, where it is instantly vaporized and decomposed. The gas of the pipe V' V² traverses the incandescent carbonaceous mass S, in which it is disassociated, and on reaching the top it unites with the vaporized and decomposed hydrocarbon, the reactions taking place as before described, and finally the combined gases emerge from the chamber through the pipe R to the gasometer or purifiers.

Where it is desirable to heat the combined gases after their treatment in the chamber A, I close the port R and employ the auxiliary chamber B, as follows: On the floor of this chamber I place broken fire-brick B' or any refractory material having interstices, and when the fuel in the chamber A is first ignited I introduce a blast of air through the pipe M', which, mixing with the unconsumed gases from the coal, causes an intense combustion in the upper part of the chamber A, and the burning gases passing through the holes E and the refractory layer B' heat the latter to a high degree. Then, after the air-blasts have been checked and the damper H closed, the combined natural gas and converted naphtha-vapor are caused to pass through the mass B', where they are very highly heated, and thence out of the port R' to the gasometer or purifiers.

Instead of introducing the naphtha upon the surface of the fuel S, it may be mechanically mixed with the natural gas before the latter enters the converting-chamber. I show apparatus for this purpose in the drawing, where T is a tank or vessel containing naphtha, and U is the natural-gas service-pipe, whose end is immersed in the liquid. A pipe, V, having a cock, V³, leads from the upper part of the tank to the pipe V², which discharges into the pit J. When the gas is caused to flow through the pipe U, instead of the pipe V', it will bubble up through the liquid in the tank T, and, becoming highly charged with hydrocarbon vapor, will discharge into the pit J, and thence will traverse the incandescent mass S, as before described. In this case the supply from the seal-pipe O may be omitted; or, if desired, it may be used to contribute an additional supply of naphtha. By regulating the amount of naphtha furnished the character of the final product, whether ethane, propane, pentane, &c., is determined.

I claim—

1. The method hereinbefore described of treating natural gas, the same consisting in heating natural gas in a chamber containing incandescent carbonaceous fuel, substantially as and for the purposes described.

2. The method hereinbefore described of treating natural gas to produce a fixed gas, the same consisting in heating natural gas and hydrocarbon vapor in a chamber containing incandescent carbonaceous fuel, substantially as and for the purposes described.

3. The method hereinbefore described of treating natural gas to produce a fixed gas, consisting in heating natural gas in a chamber containing incandescent carbonaceous fuel, and adding a volatile hydrocarbon to the gas in said chamber, substantially as and for the purposes described.

4. The method hereinbefore described of treating natural gas to produce a fixed gas, the same consisting in heating natural gas and a volatile hydrocarbon in a chamber containing incandescent carbonaceous fuel, and passing the gases thus combined through a second heating-chamber, substantially as and for the purposes described.

In testimony whereof I have hereunto set my hand this 12th day of May, A. D. 1885.

J. M. CRITCHLOW.

Witnesses:
    JAMES F. ROBB,
    A. C. JOHNSTON.